(12) United States Patent
Ho

(10) Patent No.: US 8,866,616 B2
(45) Date of Patent: Oct. 21, 2014

(54) RFID TAG HAVING ANTENNA WITH CO-PLANAR RADIATION PATTERN

(75) Inventor: Wing K. Ho, Boynton Beach, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 1064 days.

(21) Appl. No.: 11/843,536

(22) Filed: Aug. 22, 2007

(65) Prior Publication Data
US 2009/0051539 A1 Feb. 26, 2009

(51) Int. Cl.
| G08B 13/14 | (2006.01) |
| H01Q 9/28 | (2006.01) |
| G06K 19/077 | (2006.01) |
| H01Q 9/06 | (2006.01) |
| H01Q 1/22 | (2006.01) |

(52) U.S. Cl.
CPC ............ *H01Q 1/2225* (2013.01); *H01Q 9/285* (2013.01); *G06K 19/07749* (2013.01); *G06K 19/07786* (2013.01); *H01Q 9/065* (2013.01)
USPC ......... 340/572.7; 343/793; 343/803; 343/806

(58) Field of Classification Search
USPC .............. 340/572.7, 10.1; 343/767, 793–804, 343/806, 810
See application file for complete search history.

(56) References Cited

U.S. PATENT DOCUMENTS

| 4,560,445 | A |   | 12/1985 | Hoover et al. |
| 5,109,217 | A |   | 4/1992 | Siikarla et al. |
| 5,337,063 | A |   | 8/1994 | Takahira |
| 5,767,809 | A | * | 6/1998 | Chuang et al. ......... 343/700 MS |
| 5,859,587 | A | * | 1/1999 | Alicot et al. ............... 340/572.8 |

(Continued)

FOREIGN PATENT DOCUMENTS

| WO | 03044892 A1 | 5/2003 |
| WO | 2006020529 A1 | 2/2006 |
| WO | 2006021914 A1 | 3/2006 |
| WO | 2007084989 A2 | 7/2007 |

OTHER PUBLICATIONS

International Search Report and Written Opinion dated Oct. 20, 2008 for International Application No. PCT/US2008/008089, International Filing Date Jun. 28, 2008 (15-pages).

Primary Examiner — Mohammad Ghayour
Assistant Examiner — Nay Tun
(74) Attorney, Agent, or Firm — Alan M. Weisberg; Christopher & Weisberg, P.A.

(57) ABSTRACT

An radio frequency identification ("RFID") system and RFID tag that include a substrate body having a surface where the substrate body defines a plane of the tag, an RFID integrated circuit disposed on the surface of the substrate body, and an antenna that has an antenna pattern, which is disposed on the substrate body and in electrical communication with the RFID integrated circuit, the antenna generating a radiation pattern with maximum gain along an axis that is substantially coplanar with the tag. The antenna can include a first antenna portion and a second antenna portion, the first antenna portion having a first antenna end and a second antenna end, the first antenna end of the first antenna portion in electrical communication with the RFID integrated circuit and the first antenna portion forming an antenna pattern in a counterclockwise direction, and the second antenna portion having a first antenna end and a second antenna end, the first antenna end of the second antenna portion in electrical communication with the RFID integrated circuit and the second antenna portion forming an antenna pattern in a clockwise direction.

16 Claims, 7 Drawing Sheets

(56) References Cited

U.S. PATENT DOCUMENTS

| | | |
|---|---|---|
| 6,104,311 A | 8/2000 | Lastinger |
| 6,281,794 B1 | 8/2001 | Duan et al. |
| 6,300,914 B1 * | 10/2001 | Yang .......................... 343/741 |
| 6,480,110 B2 | 11/2002 | Lee et al. |
| 6,535,175 B2 | 3/2003 | Brady et al. |
| 6,696,952 B2 | 2/2004 | Zirbes |
| 6,806,812 B1 | 10/2004 | Cathey |
| 6,894,624 B2 * | 5/2005 | Kim et al. .................... 340/933 |
| 6,958,735 B2 * | 10/2005 | Handelsman ................. 343/742 |
| 7,109,867 B2 * | 9/2006 | Forster ....................... 340/572.3 |
| 7,113,143 B2 * | 9/2006 | Minemura .................... 343/870 |
| 7,202,790 B2 | 4/2007 | Copeland et al. |
| 2005/0093677 A1 | 5/2005 | Forster et al. |
| 2005/0151690 A1 * | 7/2005 | Minemura .................... 343/702 |
| 2006/0049947 A1 * | 3/2006 | Forster ....................... 340/572.3 |
| 2007/0057852 A1 * | 3/2007 | Leizerovich et al. ......... 343/702 |
| 2007/0080879 A1 * | 4/2007 | Shin et al. ................... 343/741 |
| 2008/0174437 A1 * | 7/2008 | Arguin ....................... 340/572.7 |

\* cited by examiner

RFID TAG HAVING ANTENNA WITH CO-PLANAR RADIATION PATTERN

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to tag antennas, and, in particular, to tag antennas for radio frequency identification ("RFID") systems.

BACKGROUND OF THE INVENTION

Accurately monitoring of the location and flow of the objects associated with inventory, product manufacturing, merchandising, and related operations is challenging. There is a continuing need to determine the location of these objects and to track relevant information about the objects. A tag, marker or label device suitably configured to be associated with any of a variety of objects, including goods, items, persons, or animals, or substantially any moving or stationary and animate or inanimate object, which facilitates location and data tracking, can be used. One such tag tracking system is an electronic identification system, such as RFID. RFID tags are affixed to, connected to, or in some way associated with an object for the purpose of tracking the object, and storing and retrieving information about the object.

The RFID tag stores data associated with the object. An RFID reader may scan for RFID tags by transmitting an interrogation signal at a known frequency. The RFID tags may respond to the interrogation signal with a response containing, for example, data associated with the object or an RFID tag ID. The RFID reader detects the response signal and decodes the data or the RFID tag ID. The RFID reader may be a handheld reader, or a fixed reader by which items carrying an RFID tag pass. A fixed reader may be configured as an antenna located in a pedestal similar to an electronic article surveillance ("EAS") system.

Antennas collect and emit energy in the form of electromagnetic waves. The units for this transfer take the form of power-per-unit area. Many tags for use in such tag detection systems have a single favored orientation with respect to the stimulating field where they exhibit a maximum response, i.e., they are directional. Most tags are somewhat rectangular in shape and are variations of a dipole antenna, with a high length-to-width ratio. These tags give a maximum response when oriented within an incident field orthogonal to the long axis of the tag. This property is commonly referred to as "read orientation sensitivity".

For example, FIG. 1 illustrates an example of a RFID tag 100 with an antenna 102 disposed upon substrate 104. Substrate 104 is substantially rectangular in shape. The antenna 102 comprises multiple antenna portions, i.e., antenna 102 has a first antenna portion 106 and a second antenna portion 108. The first antenna portion 106 is connected to a first side 112A of lead frame 112. Second antenna portion 108 may be connected to a second side 112B of lead frame 112. RFID chip 110 may be connected to lead frame 112 by ultrasonically bonding lead frame 112 to the conductive pads on RFID chip 110. RFID chip 110 and lead frame 112 are placed directly in the geometric center of the dielectric substrate material of substrate 104. The ends of lead frame 112 can be physically and electrically bonded to the foil antenna pattern of antenna 102. The RFID chip also can be bonded directly to antenna 102 at the conductive pads by use of conductive adhesive to eliminate the need for lead frame 112.

The first antenna portion 106 has a first antenna end 106A and a second antenna end 106B. Similarly, second antenna portion 108 has a first antenna end 108A and a second antenna end 108B. The first antenna end 106A of first antenna portion 106 is connected to lead frame 112A. First antenna portion 106 is disposed on substrate 104 and forms an inwardly spiral pattern from RFID chip 110 in a first direction, with second antenna end 106B to terminate on the inner loop of the inwardly spiral pattern on one half of the substrate 104. Similarly, first antenna end 108A of second antenna portion 108 is connected to lead frame 112B. Second antenna portion 108 is disposed on substrate 104 to form an inwardly spiral pattern from RFID chip 110 in a second direction, with second antenna end 108B to terminate on the inner loop of the inwardly spiral pattern on the other half of the substrate 104. As illustrated in FIG. 1, the two clockwise spiral sections 106, 108 of antenna 102 basically are rotationally symmetrical with respect to each other. The RFID tag 100 generates a radiation pattern 200 (FIG. 2) similar to the radiation pattern of a conventional dipole antenna.

The RFID tag 100 receives and emits best when perpendicular (e.g., along the z-axis) to its y-axis and not at all along that y-axis (also referred to as the "dipole axis"), as illustrated by the radiation pattern 200 graph of FIG. 2. The dead area in the radiation pattern 200 of the antenna 102 is referred to as a null 202. Antenna directivity is important for RFID tags because if the tag 100 is oriented where its null 202 is pointed at the tag reader, the tag 100 receives no power for excitation and therefore is not read. In general, the radiation pattern describes the sensitivity of the receiving antenna to the direction of travel or the propagation of an electromagnetic ("EM") wave. Since the EM wave is a transverse wave, the E-field component of the EM wave is perpendicular to the direction of the wave propagation.

Another situation that causes additional null regions in the radiation pattern 200 of the tag antenna 102 is when the RFID tag 100 is applied to a conductive surface, e.g., a metal surface. In order to couple energy into a "dipole-like" antenna, an excitation field ("E-field") parallel to the length of the dipole-like antenna that has the proper frequency is required. The conductive nature of the metal dictates that the tangential e-field, which is aligned with length of the dipole, will be zero on the metal surface. This effect prevents coupling of energy into the RFID tag 100, which causes a full or partial degradation of the detection performance of the RFID tag 100.

Once removed from the surface of the metal, the electric field can be non-zero. Therefore, a dielectric spacer, which provides separation between the dipole antenna and the metal surface, enables some degree of an excitation field reaching the RFID tag 100. However, a large spacer, e.g., larger than ten millimeters, is required even for ultra-high frequency ("UHF") RFID tags to regain comparable exposure to the excitation field, and thus making the packaging and application impractical. In addition, the typical dielectric spacer is relatively expensive.

In view of the above, it is desirable to provide an RFID device having a radiation pattern that is minimally affected by a conductive surface, such as a metal surface, EAS tag, etc.

SUMMARY OF THE INVENTION

The present invention advantageously provides a radio frequency identification ("RFID") system and RFID tag for operation with conductive elements.

In accordance with one aspect, the present invention provides an RFID tag for use with conductive elements that includes a substrate body having a surface and defining a plane of the tag. An RFID integrated circuit is disposed on the surface of the substrate body. An antenna that has an antenna pattern is disposed on the substrate body and is in electrical communication with the RFID integrated circuit. The antenna generates a radiation pattern with maximum gain along an axis that is substantially coplanar with the tag. The antenna can include a first antenna portion and a second antenna portion. The first antenna portion has a first antenna end and a second antenna end. The first antenna end of the first portion is in electrical communication with the RFID integrated circuit. The first antenna portion forms an antenna pattern in a counterclockwise direction. The second antenna portion has a first antenna end and a second antenna end. The first antenna end of the second antenna portion in electrical communication with the RFID integrated circuit. The second antenna portion forms an antenna pattern in a clockwise direction.

In accordance with another aspect, the present invention provides an RFID system for use with conductive elements that includes a RFID reader that generates interrogation signals, and a security tag to receive the interrogation signal and transmit a response signal. The security tag includes a substrate body having a surface and defining a plane of the tag. An RFID integrated circuit is disposed on the surface of the substrate body. An antenna that has an antenna pattern is disposed on the substrate body and is in electrical communication with the RFID integrated circuit. The antenna arranged to generate a radiation pattern with maximum gain along an axis that is substantially coplanar with the tag.

In accordance with another aspect, the present invention provides an RFID tag for use with conductive elements that includes a substrate body having a surface and defining a plane of the tag, an RFID integrated circuit disposed on the surface of the substrate body, a conductive element, the conductive element proximate the substrate body, and an antenna that has an antenna pattern. The antenna is disposed on the substrate body and in electrical communication with the RFID integrated circuit, the antenna arranged to generate a radiation pattern with maximum gain along an axis that is substantially coplanar with the tag.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 3:
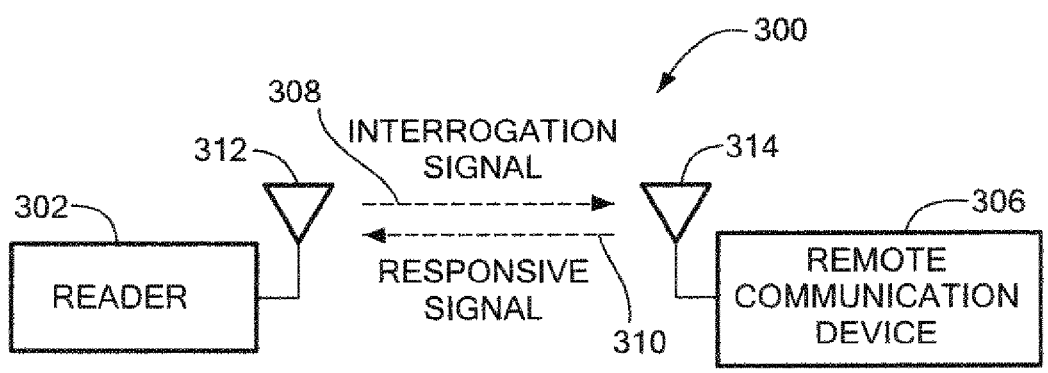
FIG. 3 is a diagram of a RFID system constructed in accordance with the principles of the present invention.

Referring now to the drawing figures in which like reference designators refer to like elements, there is shown in FIG. 3 a diagram of an exemplary system constructed in accordance with the principles of the present invention and designated generally as "300". Communication system 300 provides an electronic identification system in the embodiment described herein. Further, the described communication system 300 is configured for backscatter communications as described in detail below. It is contemplated that other communication protocols can be utilized in other embodiments.

The depicted communication system 300 includes at least one reader 302 having at least one electronic wireless remote communication device 306. Radio frequency ("RF") communications can occur between a reader 302 and remote communication devices 306 for use in identification systems and product monitoring systems as exemplary applications.

Remote communication devices 306 include radio frequency identification ("RFID") devices in the embodiments described herein. Multiple wireless remote communication devices 306 typically communicate with reader 302 although only one such device 306 is illustrated in FIG. 3.

Although multiple communication devices 306 can be employed in communication system 300, there is typically no communication between the multiple communication devices 306 themselves. Instead, the multiple communication devices 306 communicate with reader 302. Multiple communication devices 306 can be used in the same field of reader 302, i.e., within the communication range of reader 302. Similarly, multiple readers 302 can be in proximity to one or more of devices 306.

Remote communication device 306 is configured to interface with reader 302 using a wireless medium in one embodiment. More specifically, communication between communication device 306 and reader 302 occur via an electromagnetic link, such as an RF link, e.g., at microwave frequencies in the described embodiment. Reader 302 is configured to output forward link wireless communication signals 308. Further, reader 302 is operable to receive return link wireless communication signals 310, e.g., a reply signal, from devices 306 responsive to the forward link communication signals 308. In accordance with the above, forward link communication signals and return link communication signals are wireless signals, such as radio frequency signals. Other forms of communication signals, such as infrared, acoustic, and the like are contemplated.

Reader unit 302 includes at least one antenna 312 as well as transmitting and receiving circuitry, similar to that implemented in devices 306. Antenna 312 comprises a transmit/receive antenna connected to reader 302. In an alternative embodiment, reader 302 can have separate transmit and receive antennas.

In operation, reader 302 transmits a forward link communication signal 308, e.g., an interrogation command signal, via antenna 312. Communication device 306 is operable to receive the incoming forward link signal 308. Upon receiving signal 308, communication device 306 responds by communicating the responsive return link communication signal 310, e.g., a responsive reply signal. Communications within system 300 are described in greater detail below.

In one embodiment, responsive return link communication signal 310, e.g., a responsive reply signal is encoded with information that uniquely identifies or labels the particular device 306 that is transmitting so as to identify any object, animal, or person with which communication device 306 is associated. Communication devices 306 can be RFID tags that are attached to objects or people where each tag is programmed with information relating to the object or person to which it is attached. The information can take a wide variety of forms and can be more or less detailed depending on the needs to be served by the information. For example, the information may include merchandise identification information, such as a universal product code. A tag may include identifying information and security clearance information for an authorized person to whom the tag has been issued. A tag may also have a unique serial number, in order to uniquely identify an associated object or person. Alternatively, a tag may include more detailed information relating to an object or person, such as a complete description of the object or person. As a further exemplary alternative, a tag may store a single bit, in order to provide for theft control or simple tracking of entry and departure through the detection of an object or person at a particular reader, without necessarily specifically identifying the object or person.

Remote device 306 is configured to output a reply signal within reply link communication 310 responsive to receiving forward link wireless communication 308. Reader 302 is configured to receive and recognize the reply signal within the reply link communication signal 310, e.g., return signal. The reply signal can be utilized to identify the particular transmitting communication device 306 and may include various types of information corresponding to the communication device 306 including but not limited to stored data, configuration data or other command information.

An exemplary embodiment of a reader 302 is explained with reference to FIG. 4. In this embodiment, the reader 302 has a RF module or unit 400 and a controller module or unit 402. The RF module 400 includes a radio signal source 404 for synthesizing radio frequency signals, e.g., an interrogating RF signal, that outputs a RF signal to transceiver 406 of the reader 302. The interrogating RF signal from the source 404 uses a suitable frequency such as 915 MHz. When the radio signal source 404 is energized, transceiver 406 transmits the interrogating RF signal (typically after the RF signal has been modulated with an information signal) through antenna 312 to a suitable antenna 314 such as a dipole antenna at the wireless communication device 306.

Modulated signals are received from communication device 306 via antenna 312 and passed to transceiver 406. Controller module 402 of reader 302 receives the digital equivalent of the modulated signal. In one embodiment, controller module 402 produces signals in a sequence having a pattern identifying the pattern of the 1's and 0's in read only memory ("ROM") 408 of communication device 306. For example, the received and processed sequence may be compared in reader 302 with a desired sequence to determine whether the object being identified is being sought by reader 302 or not.

Figure 4:
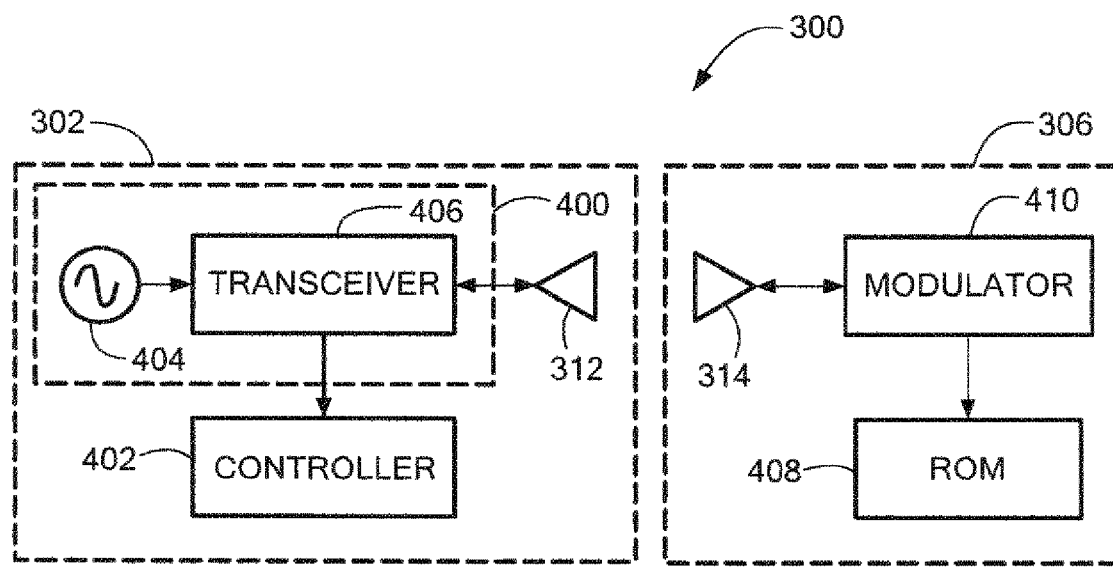
FIG. 4 is a diagram of another embodiment of a RFID system constructed in accordance with the principles of the present invention.

Continuing to refer to FIG. 4, one embodiment of remote communication device 306 is explained. The depicted communication device 306 includes a modulator 410 having a receiver/transmitter as described below and a data source such as ROM 408, which provides a sequence of binary 1's and binary 0's in an individual pattern to identify the object. In this embodiment, a binary "1" in ROM 408 causes a modulator 410 to produce a first plurality of signal cycles and a binary "0" in ROM 408 causes the modulator 410 to produce a second plurality of signal cycles different from the first plurality of signals. The pluralities of signals cycles are sequentially produced by the modulator 410 to represent the pattern of binary 1's and binary 0's which identify the object are introduced to the dipole antenna 314 for transmission to antenna 312 at reader 302. In another embodiment, the communication device 306 can have separate receive and transmit antennas. Communication device 306 may further include an optional power source (not shown) connected to modulator 410 to supply operational power to modulator 410.

Figure 5:
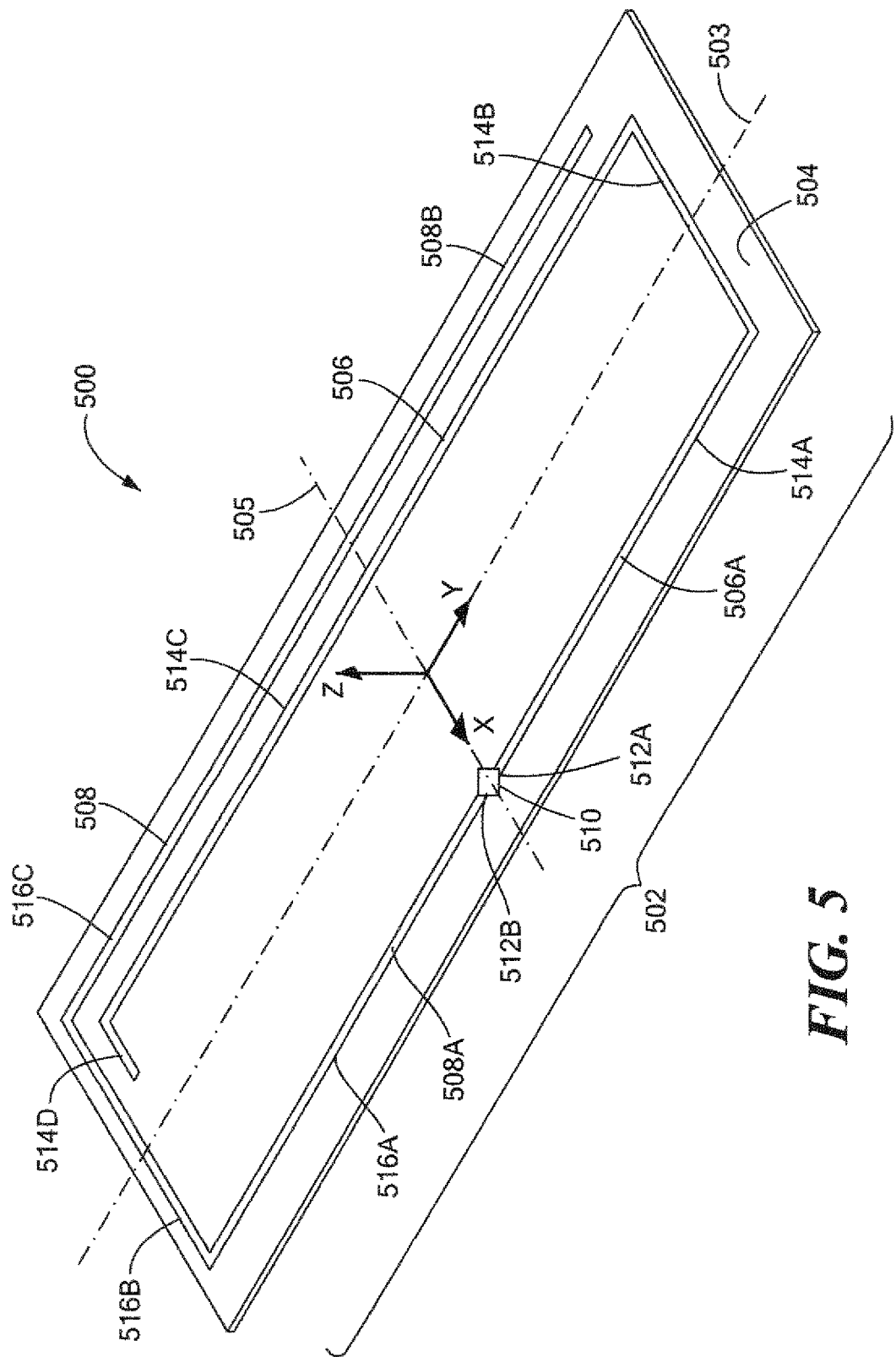
FIG. 5 is a diagram of an exemplary tag having an antenna constructed in accordance with the principles of the present invention.

FIG. 5 illustrates a RFID tag 500 constructed in accordance with the principles of the present invention. In this embodiment, an antenna 502 can be disposed upon substrate 504. Substrate 504 can be substantially rectangular in shape but also may have various other geometrical shapes to meet packaging and performance parameters. Substrate 504 can define a latitudinal axis 503 that is parallel to the proximal and distal longer edges of substrate 504 and intersects the center point of substrate 504. Thus, latitudinal axis 503 lies along the y-axis and divides the substrate 504 into a distal half and a proximal half. Substrate 504 also can define a longitudinal axis 505 that is parallel to the left and right short edges of substrate 504 and intersects the center point of substrate 504. Thus longitudinal axis 505 lies along the x-axis and divides the substrate 504 into a left half and a right half. Substrate 504 can comprise any type of material suitable for mounting antenna 502, optional lead frame 512, and RFID chip 510. For example, material for substrate 504 may include base paper, polyethylene, polyester, and so forth. The particular material implemented for substrate 504 may impact the RF performance of RFID tag 500. More particularly, the dielectric constant and the loss tangent may characterize the dielectric properties of an appropriate substrate material for use as substrate 504.

The antenna 502 can have multiple antenna portions, such as a first antenna portion 506 and a second antenna portion 508. The first antenna portion 506 can be connected to a first side 512A of lead frame 512. Second antenna portion 508 can be connected to a second side 512B of lead frame 512. RFID chip 510 may be connected to lead frame 512 by ultrasonically bonding lead frame 512 to the conductive pads on RFID chip 510. As illustrated in FIG. 5, RFID chip 510 and lead frame 512 can be placed near the proximal longer edge of the dielectric substrate material of substrate 504. In this embodiment, RFID chip 510 and lead frame 512 can be placed 1 to 5 mm from the proximal longer edge of the substrate 504. The ends of lead frame 512 may be physically and electrically bonded to the antenna pattern of antenna 502.

The first antenna portion 506 can have a first antenna end 506A and a second antenna end 506B. Similarly, second antenna portion 508 can have a first antenna end 508A and a second antenna end 508B. The first antenna end 506A of first antenna portion 506 is connected to lead frame 512A. The first antenna portion 506 can include several segments 514A, 514B, 514C and 514D to define a section of the antenna pattern of antenna 502. The second antenna portion 508 can include several segments 516A, 516B and 516C to define a second section of the antenna pattern of antenna 502. In this embodiment, segment 514A is disposed on substrate 504 and extends outward from RFID chip 510 toward the right short edge of substrate 504 in a substantially parallel direction to the proximal longer edge of substrate 504. Segment 514B is disposed on substrate 504 and extends outward from the end of segment 514A toward the distal longer edge of substrate 504 in a substantially parallel direction to the right edge of substrate 504. Segment 514C is disposed on substrate 504 and extends inward from the end of segment 514B toward the left short edge of substrate 504 in a substantially parallel direction to the distal longer edge of substrate 504. Segment 514D is disposed on substrate 504 and extends inward from the end of segment 514C toward the proximal longer edge of substrate 504 in a substantially parallel direction to the left short edge of substrate 504.

Continuing to refer to FIG. 5, segment 516A is disposed on substrate 504 and extends outward from RFID chip 510 toward the left short edge of substrate 504 in a substantially parallel direction to the proximal longer edge of substrate 504. Segment 516B is disposed on substrate 504 and extends outward from the end of segment 516A toward the distal longer edge of substrate 504 in a substantially parallel direction to the left short edge of substrate 504. Segment 516C is disposed on substrate 504 and extends inward from the end of segment 516B toward the right edge of substrate 504 in a substantially parallel direction to the distal longer edge of substrate 504. In this embodiment, segment 516C can extent substantially the full length of the substrate 504 from the left short edge of substrate 504 to the right edge of substrate 504. In this embodiment, the segment 516C of second antenna portion 508 can be positioned closer to the distal longer edge of substrate 504 than the segment 514C of the first antenna portion 506 and at least partially enclose the second end 506B of the first antenna portion 506. The segment 516C can be modified by further extension and wrapping or by further reduction to achieve the appropriate resonance frequency for wireless communication.

Figure 1:
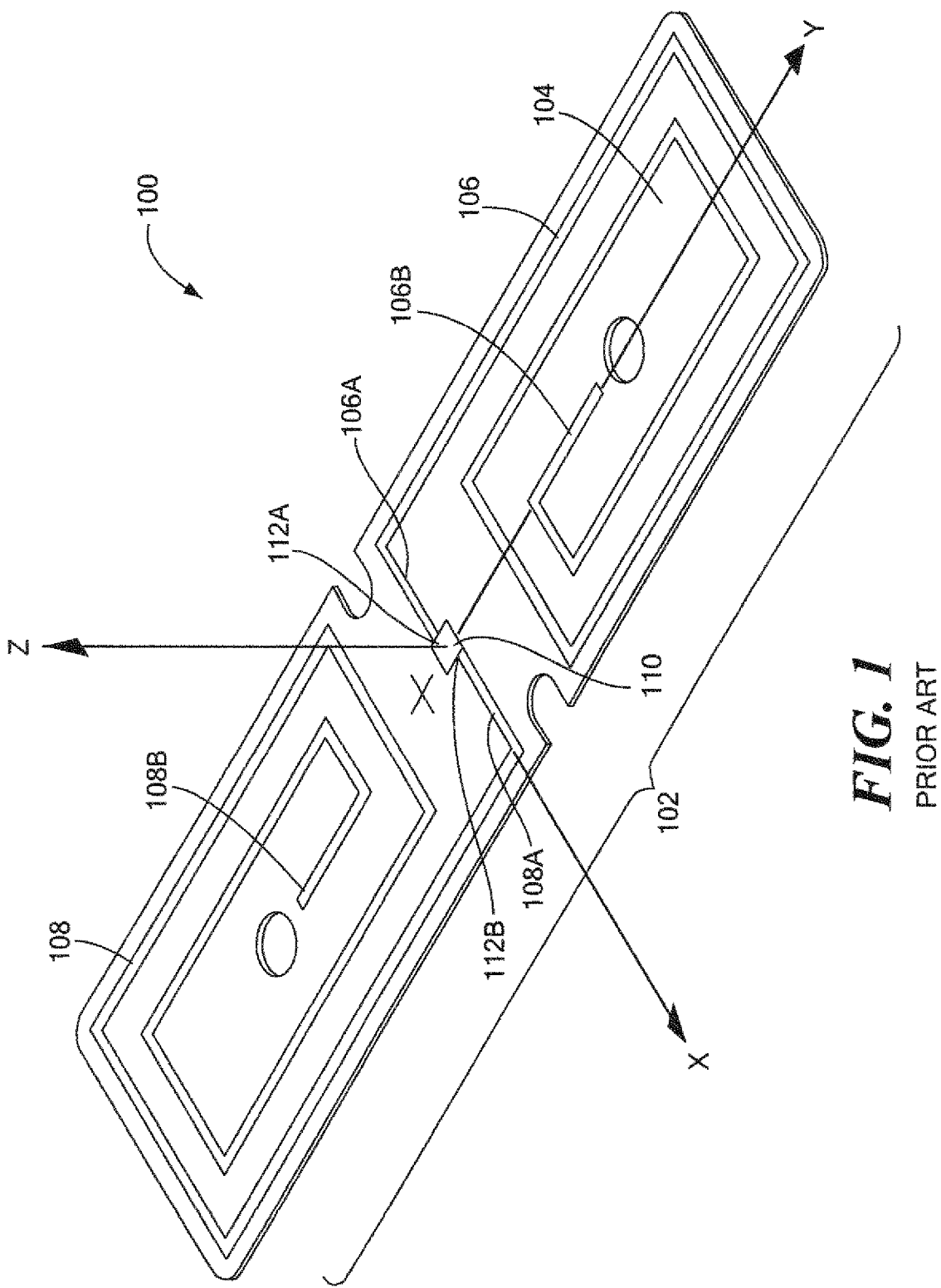
FIG. 1 is a diagram of a conventional RFID tag.
Figure 2:
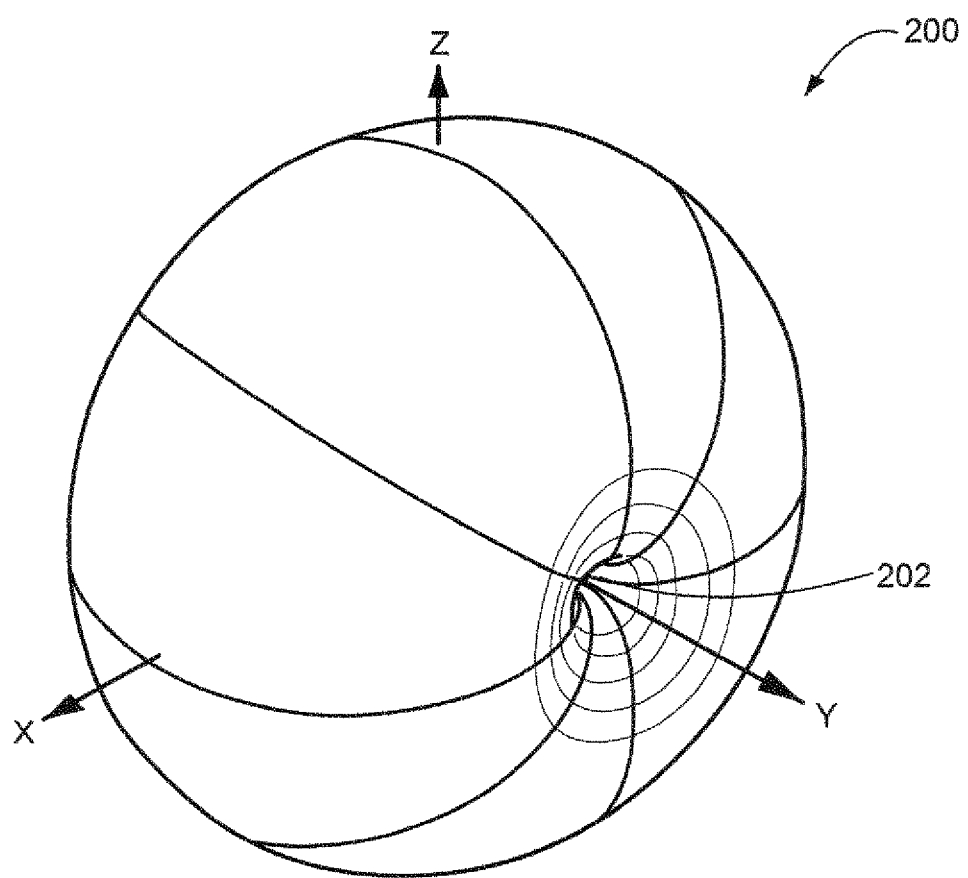
FIG. 2 is a diagram illustrating an example of a three-dimensional radiation pattern of the conventional tag antenna of FIG. 1.
Figure 6:
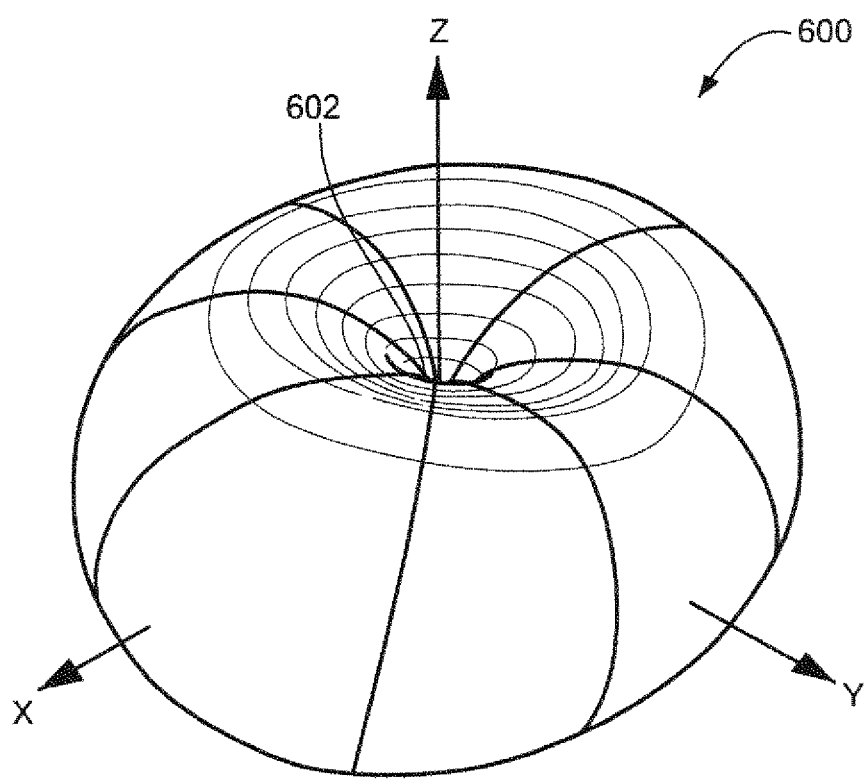
FIG. 6 is a diagram illustrating an example of a three-dimensional radiation pattern of the antenna of the tag of FIG. 5 constructed in accordance with the principles of the present invention.

The antenna pattern of FIG. 5 advantageously generates the antenna radiation pattern 600 as illustrated in FIG. 6. The antenna radiation pattern 600 of tag 500 has a direction of sensitivity in an orthogonal direction, e.g., the z-axis, to the substrate 504 plane, e.g., the y-axis. A comparison of the graph of FIG. 6 and the graph of FIG. 2, illustrates that the radiation pattern 600 of tag 500 is rotated approximately 90 degrees to the left about the x-axis as opposed to the radiation pattern 200 of tag 100. In other words, the null of the radiation pattern 600 is orthogonal to the plane defined by the substrate 504. Thus, unlike the radiation pattern 200 of conventional tag 100, the direction of sensitivity of tag 500, as evidenced by the null 602, is orthogonal or normal to the tag plane. Therefore, the effects of a conductive element or surface, e.g., a metal surface or EAS tag (not shown), to which the tag 500 can be attached is minimized, since the external excitation field couples into tag 500 along the orthogonal axis normal to the plane defined by the conductive element or surface.

Figure 7:
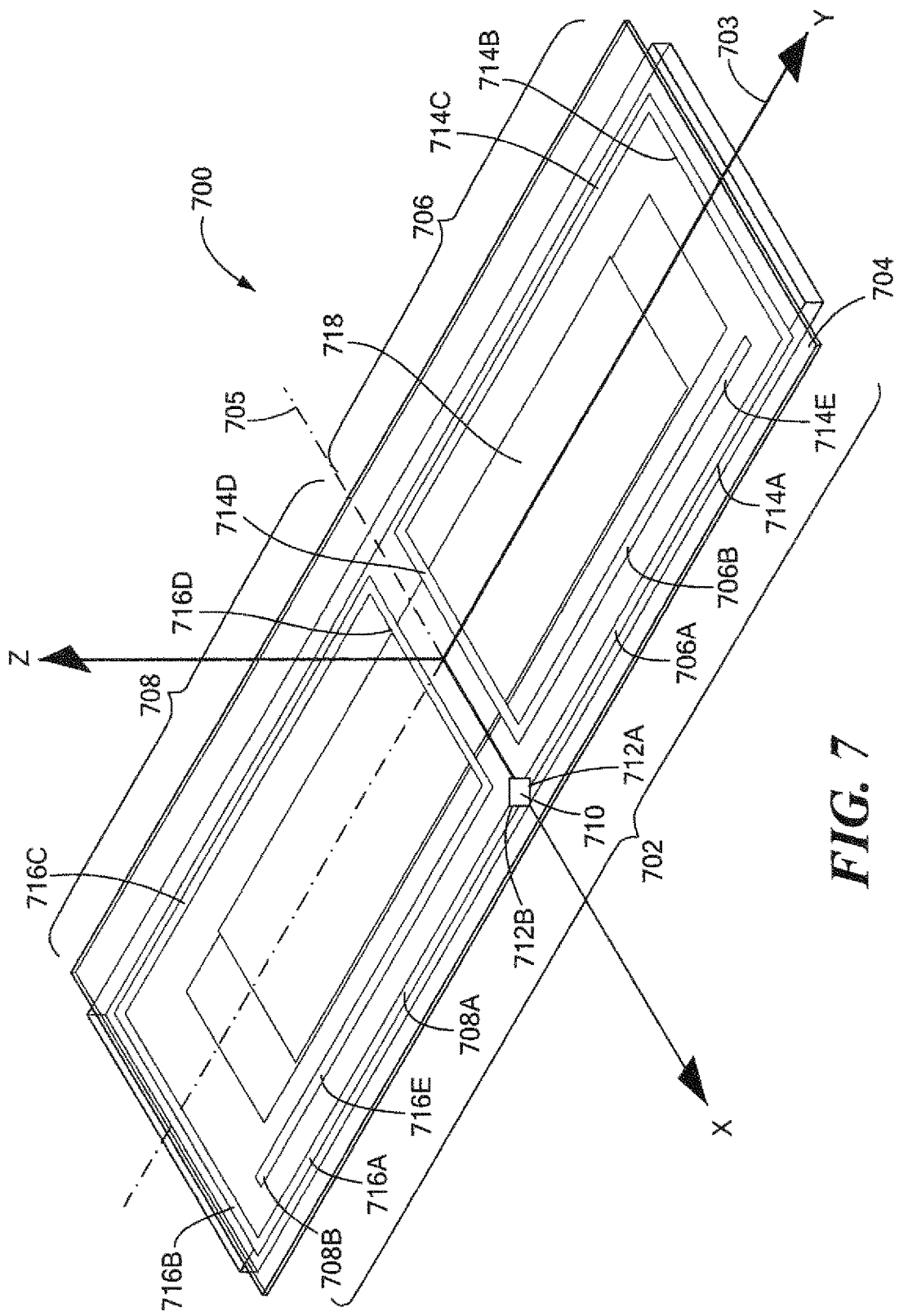
FIG. 7 is a diagram of another exemplary tag having an antenna constructed in accordance with the principles of the present invention.

FIG. 7 illustrates an embodiment of a RFID tag 700 constructed in accordance with the principles of the present invention. In this embodiment, an antenna 702 can be disposed upon substrate 704. Substrate 704 can be similar to substrate 504 in material and geometric shape as described above with respect to substrate 504. Substrate 704 can define a latitudinal axis 703 that is parallel to the proximal and distal longer edges of substrate 704 and intersects the center point of substrate 704. Thus latitudinal axis 703 lies along the y-axis and divides the substrate 504 into a distal half and a proximal half. Substrate 704 also can define a longitudinal axis 705 that is parallel to the left and right short edges of substrate 704 and intersects the center point of substrate 704. Thus longitudinal axis 703 lies along the x-axis and divides the substrate 704 into a left half and a right half.

The antenna 702 can have multiple antenna portions, such as a first antenna portion 706 and a second antenna portion 708. The first antenna portion 706 can be connected to a first side 712A of lead frame 712. Second antenna portion 708 can be connected to a second side 712B of lead frame 712. RFID chip 710 may be connected to lead frame 712 by ultrasonically bonding lead frame 712 to the conductive pads on RFID chip 710. As illustrated in FIG. 7, RFID chip 710 and lead frame 712 can be placed near the proximal longer edge of the dielectric substrate material of substrate 704. In this embodiment, RFID chip 710 and lead frame 712 can be placed 1 to 5 mm from the proximal longer edge of the substrate 704. The ends of lead frame 712 may be physically and electrically bonded to the antenna pattern of antenna 702.

The first antenna portion 706 can have a first antenna end 706A and a second antenna end 706B. Similarly, second antenna portion 708 has a first antenna end 708A and a second antenna end 708B. The first antenna end 706A of first antenna portion 706 is connected to lead frame 712A. The first antenna portion 706 can include several segments 714A, 714B, 714C, 714D and 714E to define a section of the antenna pattern of antenna 702. The second antenna portion 708 can include several segments 716A, 716B, 716C, 716D and 716E to define a second section of the antenna pattern of antenna 702. In this embodiment, segment 714A is disposed on substrate 704 and extends outward from RFID chip 710 toward the right edge of substrate 704 in a substantially parallel direction to the proximal longer edge of substrate 704. Segment 714B is disposed on substrate 704 and extends outward from the end of segment 714A toward the distal longer edge of substrate 704 in a substantially parallel direction to the right edge of substrate 704. Segment 714C is disposed on substrate 704 and extends inward from the end of segment 714B toward the center portion of substrate 704 in a substantially parallel direction to the distal longer edge of substrate 704. Segment 714D is disposed on substrate 704 and extends inward from the end of segment 714C toward the proximal longer edge of substrate 704 and segment 714A in a substantially parallel direction to the left short edge of substrate 704. Segment 714E is disposed on substrate 704 and extends outward from the end of segment 714D toward the right edge of substrate 704.

Continuing to refer to FIG. 7, segment 716A is disposed on substrate 704 and extends outward from RFID chip 710 toward the left short edge of substrate 704 in a substantially parallel direction to the proximal longer edge of substrate 704. Segment 716B is disposed on substrate 704 and extends outward from the end of segment 716A toward the distal longer edge of substrate 704 in a substantially parallel direction to the left short edge of substrate 704. Segment 716C is disposed on substrate 704 and extends inward from the end of segment 716B toward the center portion of substrate 704 in a substantially parallel direction to the distal longer edge of substrate 704. Segment 716D is disposed on substrate 704 and extends inward from the end of segment 716C toward the proximal longer edge of substrate 704 and segment 716A in a substantially parallel direction to the left short edge of substrate 704. Segment 716E is disposed on substrate 704 and extends outward from the end of segment 716D toward the left short edge of substrate 704. In this embodiment, the first antenna portion 706 and the second antenna portion 708 are substantially symmetrical.

Figure 8:
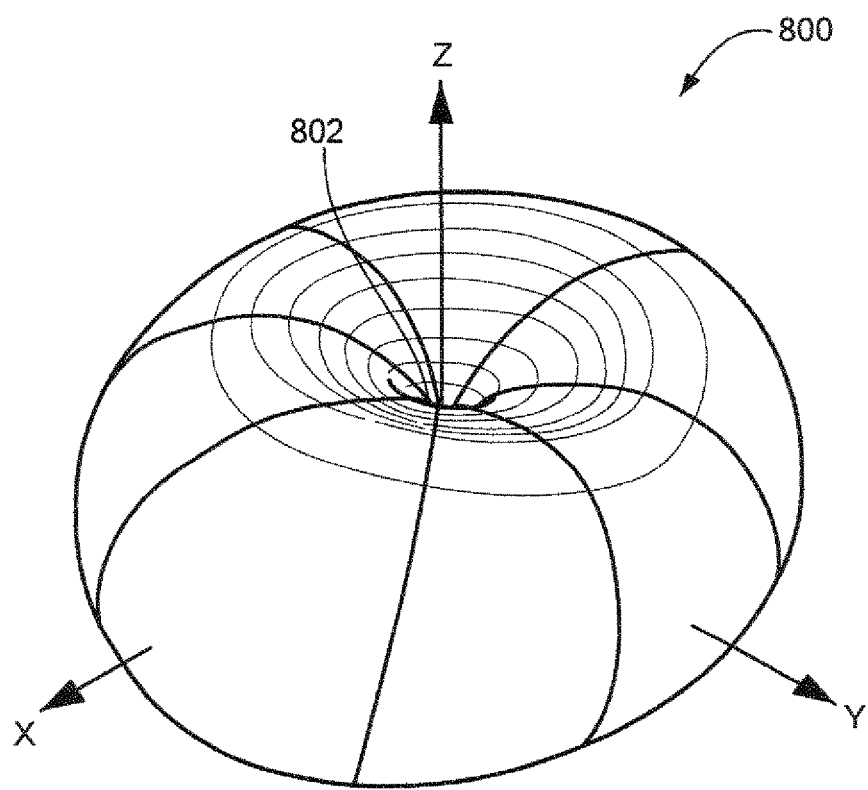
FIG. 8 is a diagram illustrating an example of a three-dimensional power gain radiation pattern of the antenna of the tag of FIG. 7 constructed in accordance with the principles of the present invention.

The antenna pattern 702 illustrated in FIG. 7 can be overlaid on or incorporated with a conductive element or surface 718, e.g., an electronic article surveillance ("EAS") tag such as the UltraMax® manufactured by Sensormatic Electronics Corporation, to form RFID tag 700, which advantageously generates the antenna radiation pattern 800 as illustrated in FIG. 8. In this embodiment, the electronic article surveillance device can be, for example, a magneto-acoustic device. The antenna radiation pattern 800 of antenna pattern 702 overlaid on the conductive element or surface 718 has a direction of sensitivity in an orthogonal direction, e.g., the z-axis, to the substrate 704 plane, e.g., the y-axis. The field effects of the symmetrical geometry of the first antenna portion 706 and the second antenna portion 708 combined with the RFID chip 710 and optional lead frame 712 positioned near the proximal longer edge of substrate 704 generate a radiation pattern with a maximum gain that is coplanar with the tag. A comparison of the graph of FIG. 8 and the graph of FIG. 6, illustrates similar rotational orientation and field strength for the radiation patterns of tag 800 and tag 600.

A comparison of the graph of FIG. 8 and the graph of FIG. 2, illustrates that the radiation pattern 800 of tag 700 is rotated approximately 90 degrees to the left about the x-axis as opposed to the radiation pattern 200 of tag 100. In other words, the null of the radiation pattern 800 is orthogonal to the plane defined by the substrate 704. Thus, unlike the radiation pattern 200 of conventional tag 100, the direction of sensitivity of tag 700, as evidenced by the null 802, is orthogonal or normal to the tag plane and the plane of the conductive element or surface 718. Therefore, the effects of a conductive element or surface, e.g., a metal surface or EAS tag, to which the tag antenna 702 can be combined, are used to generate the desired radiation pattern 800 with a maximum gain that is coplanar with the tag.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An radio frequency identification (RFID) tag, the tag comprising:
a substrate having a first surface and a second surface opposite to the first surface, the substrate defining a plane of the tag;
a conductive element disposed on the first surface of the substrate;
an RFID integrated circuit disposed on the second surface of the substrate; and
an antenna having an antenna pattern, the antenna disposed on the second surface of the substrate and in electrical communication with the RFID integrated circuit, the antenna having a first clockwise dipole element forming a first spiral and a second counterclockwise dipole element forming a second spiral, the antenna and the conductive element arranged to generate a radiation pattern having a maximum gain along an axis that is substantially coplanar with the plane of the tag that is greater than a maximum gain along an axis that is substantially orthogonal to the plane of the tag, the radiation pattern exhibiting a null substantially orthogonal to the plane of the tag.

2. The RFID tag of claim 1, wherein the first clockwise dipole element and the second counterclockwise dipole element are asymmetric with respect to each other.

3. The RFID tag of claim 1, wherein the substrate has a first edge, a second edge opposite the first edge, a third edge, and a fourth edge opposite the third edge, the third and fourth edges are longer than the first and second edges; and
the first clockwise dipole element and second counterclockwise dipole element each include a plurality of segments, at least one of the plurality of segments of the second counterclockwise dipole element extending substantially from the first edge of the substrate to the second edge of the substrate, the at least one of the plurality of segments being substantially parallel to the third edge of the substrate.

4. The RFID tag of claim 3, wherein the RFID integrated circuit is positioned proximate the midpoint of the fourth edge of the substrate.

5. The RFID tag of claim 4, wherein the RFID integrated circuit is approximately 1 to 5 mm from the midpoint of the fourth edge of the substrate.

6. The RFID tag of claim 1, wherein the
first clockwise dipole element encompasses a first half portion of the surface of the substrate; and
the second counterclockwise dipole element encompasses a second half portion of the surface of the substrate, the first clockwise dipole element being located only in the first half portion, and the second counterclockwise dipole element being located only in the second half portion.

7. A RFID system, the system comprising:
a radio frequency identification reader generating interrogation signals; and
a security tag to receive the interrogation signal and transmit a response signal, the security tag comprising:
a substrate having a first surface and a second surface opposite to the first surface, the substrate defining a plane of the tag;
a conductive element disposed on the first surface of the substrate;
an RFID integrated circuit disposed on the second surface of the substrate; and
an antenna having an antenna pattern, the antenna disposed on the second surface of the substrate and in electrical communication with the RFID integrated circuit, the antenna having a first clockwise dipole element forming a first spiral and a second counterclockwise dipole element forming a second spiral, the antenna and the conductive element arranged to generate a radiation pattern having a maximum gain along an axis that is substantially coplanar with the plane of the tag that is greater than a maximum gain along an axis that is substantially orthogonal to the plane of the tag, the radiation pattern exhibiting a null substantially orthogonal to the plane of the tag.

8. The RFID system of claim 7, wherein the first clockwise dipole element at least partially encloses the second counterclockwise dipole element.

9. The RFID system of claim 8, wherein the substrate has a first edge, a second edge opposite the first edge, a third edge, and a fourth edge opposite the third edge, the third and fourth edges are longer than the first and second edges; and the first clockwise dipole element and the second counterclockwise dipole element each include a plurality of segments, at least one of the plurality of segments of the second counterclockwise dipole element extending substantially from the first edge of the substrate to the second edge of the substrate, the at least one of the plurality of segments being substantially parallel to the third edge of the substrate.

10. The RFID system of claim 9, wherein the RFID integrated circuit is positioned proximate the midpoint of the fourth edge of the substrate.

11. The RFID system of claim 9, wherein the RFID integrated circuit is approximately 1 to 5 mm from the fourth edge of the substrate.

12. The RFID system of claim 7, wherein the first clockwise dipole element encompasses a first half portion of the surface of the substrate; and the second counterclockwise dipole element encompasses a second half portion of the surface of the substrate, the first clockwise dipole element being located only in the first half portion, and the second counterclockwise dipole element being located only in the second half portion.

13. An radio frequency identification (RFID) tag, the tag comprising:

a substrate having a first surface and a second surface opposite to the first surface, the substrate defining a plane of the tag;

a conductive element disposed on the first surface of the substrate;

an RFID integrated circuit disposed on the second surface of the substrate; and an antenna having an antenna pattern, the antenna disposed on the second surface of the substrate and in electrical communication with the RFID integrated circuit, the antenna having a first clockwise dipole element forming a first spiral and a second counterclockwise dipole element forming a second spiral, the combined antenna and conductive element generating a radiation pattern having a maximum gain along an axis that is substantially coplanar with the plane of the tag that is greater than a maximum gain along an axis that is substantially orthogonal to the plane of the tag, the radiation pattern exhibiting a null substantially orthogonal to the plane of the tag.

14. The RFID tag of claim 13, wherein the substrate has a first edge, a second edge opposite the first edge, a third edge, and a fourth edge opposite the third edge, the third and fourth edges are longer than the first and second edges; and the first clockwise dipole element and the second counterclockwise dipole element each include a plurality of segments, at least one of the plurality of segments of the second counterclockwise dipole element extending substantially from the first edge of the substrate to the second edge of the substrate, the at least one of the plurality of segments being substantially parallel to the third edge of the substrate.

15. The RFID tag of claim 14, wherein the RFID integrated circuit is positioned proximate the midpoint of the fourth edge of the substrate.

16. The RFID tag of claim 13, wherein first clockwise dipole element encompasses a first half portion of the surface of the substrate; and the second counterclockwise dipole element encompasses a second half portion of the surface of the substrate, the first clockwise dipole element being located only in the first half portion, and the second counterclockwise dipole element being located only in the second half portion.

* * * * *